US009925889B2

United States Patent
Hao et al.

(10) Patent No.: US 9,925,889 B2
(45) Date of Patent: Mar. 27, 2018

(54) ELECTRIC MACHINE FOR HYBRID POWERTRAIN WITH DUAL VOLTAGE POWER SYSTEM

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/194,600

(22) Filed: Jun. 28, 2016

(65) Prior Publication Data

US 2017/0057373 A1  Mar. 2, 2017

Related U.S. Application Data

(60) Provisional application No. 62/209,080, filed on Aug. 24, 2015.

(51) Int. Cl.
*H02P 1/00* (2006.01)
*H02K 21/12* (2006.01)
(Continued)

(52) U.S. Cl.
CPC ....... *B60L 11/1868* (2013.01); *B60L 11/1803* (2013.01); *B60L 15/20* (2013.01);
(Continued)

(58) Field of Classification Search
None
See application file for complete search history.

(56) References Cited

U.S. PATENT DOCUMENTS 2,990,508 A    6/1961  Thompson
5,166,568 A   11/1992  Nystuen et al.
(Continued)

FOREIGN PATENT DOCUMENTS

CN    1202028 A    12/1998
CN    1856921 A    11/2006
(Continued)

OTHER PUBLICATIONS

Milind Paradkar, Design of a High Performance Ferrite Magnet-Assisted Synchronous Reluctance Motor for an Electric Vehicle, Institute of Electrical and Electronics Engineers, 2012, pp. 4079-4083.

*Primary Examiner* — Bentsu Ro
*Assistant Examiner* — Zemenay Truneh
(74) *Attorney, Agent, or Firm* — Quiunn IP Law

(57) ABSTRACT

An electric machine is provided for a dual voltage power system having a first energy storage system (HV-ESS) with a first nominal voltage and second energy storage system (LV-ESS with a second nominal voltage). The electric machine includes a rotor assembly having a rotor core configured to support permanent magnets spaced around the rotor core to define a number of rotor poles. The rotor core has multiple rotor slots arranged as at least one barrier layer at each of the rotor poles. Permanent magnets are disposed in the at least one barrier layer. A stator assembly surrounds the rotor assembly. The electric machine is configured to be operatively connected with the HV-ESS. The electric machines has at least one of a predetermined efficiency at rated power, a predetermined power density, a predetermined torque density, a predetermined peak power range, or a predetermined maximum speed of the electric machine.

20 Claims, 11 Drawing Sheets

(51) Int. Cl.
  *B60L 11/18*    (2006.01)
  *H02K 1/27*     (2006.01)
  *H02K 11/33*    (2016.01)
  *H02K 21/14*    (2006.01)
  *H02K 3/28*     (2006.01)
  *B60L 15/20*    (2006.01)

(52) U.S. Cl.
  CPC ............. *H02K 1/2766* (2013.01); *H02K 3/28* (2013.01); *H02K 11/33* (2016.01); *H02K 21/14* (2013.01); *B60L 2240/441* (2013.01); *B60L 2240/443* (2013.01); *Y02T 10/641* (2013.01); *Y02T 10/645* (2013.01); *Y02T 10/7005* (2013.01); *Y02T 10/7066* (2013.01); *Y02T 10/72* (2013.01); *Y02T 10/7275* (2013.01)

(56) References Cited

U.S. PATENT DOCUMENTS

| | | |
|---|---|---|
| 7,556,082 B2 | 7/2009 | Welchko et al. |
| 8,928,197 B2 | 1/2015 | Jurkovic et al. |
| 8,933,606 B2 | 1/2015 | Rahman et al. |
| 2005/0140236 A1 | 6/2005 | Jeong et al. |
| 2006/0017345 A1 | 1/2006 | Uchida et al. |
| 2006/0208606 A1* | 9/2006 | Hirzel .................... H02K 21/24 310/268 |
| 2007/0216249 A1 | 9/2007 | Gruendel et al. |
| 2009/0045688 A1 | 2/2009 | Liang et al. |
| 2010/0079026 A1 | 4/2010 | Han et al. |
| 2010/0244610 A1 | 9/2010 | Hao et al. |
| 2011/0109180 A1 | 5/2011 | Akutsu et al. |
| 2011/0169363 A1 | 7/2011 | Summers et al. |
| 2011/0198962 A1 | 8/2011 | Tang |
| 2012/0187877 A1 | 7/2012 | Yamagiwa et al. |
| 2013/0069470 A1 | 3/2013 | Jurkovic et al. |
| 2013/0147303 A1* | 6/2013 | Kaiser ................. H02K 1/2766 310/156.38 |
| 2013/0270952 A1 | 10/2013 | Jurkovic et al. |
| 2014/0046520 A1* | 2/2014 | Katoch ................. B60L 3/0046 701/22 |
| 2014/0252903 A1 | 9/2014 | Rahman et al. |
| 2015/0295459 A1 | 10/2015 | Hao et al. |
| 2017/0063187 A1 | 3/2017 | Hao et al. |

FOREIGN PATENT DOCUMENTS

| | | |
|---|---|---|
| CN | 102263445 A | 11/2011 |
| JP | 2000316241 A | 11/2000 |

* cited by examiner

ELECTRIC MACHINE FOR HYBRID POWERTRAIN WITH DUAL VOLTAGE POWER SYSTEM

CROSS-REFERENCE TO RELATED APPLICATION

This application claims the benefit of U.S. Provisional Application No. 62/209,080, filed Aug. 24, 2015, which is hereby incorporated by reference in its entirety.

TECHNICAL FIELD

The present teachings generally include an electric machine for a powertrain, and more particularly, an interior permanent magnet electric machine.

BACKGROUND

An electric motor utilizes electric potential energy to produce mechanical torque through the interaction of magnetic fields and electric current-carrying conductors. Some electric motors can also function as generators by using torque to produce electrical energy. An interior permanent magnet electric machine has a rotor assembly that includes a rotor core with magnets of alternating polarity spaced around the rotor core.

SUMMARY

An electric machine is provided for a dual voltage power system having a first energy storage system (HV-ESS) with a first nominal voltage and second energy storage system (LV-ESS) with a second nominal voltage. The electric machine includes a rotor assembly having a rotor core configured to support permanent magnets spaced around the rotor core to define a number of rotor poles. The rotor core has multiple rotor slots arranged as at least one barrier layer at each of the rotor poles. The at least one barrier layer is positioned between an inner periphery of the rotor core and an outer periphery of the rotor core. Permanent magnets are disposed in the at least one barrier layer. A stator assembly surrounds the rotor assembly. The electric machine is configured to be operatively connected with the HV-ESS to function as at least one of a motor and a generator. The rotor assembly, the stator assembly, and the magnets are configured with parameters selected to provide at least one of a predetermined efficiency at rated power, a predetermined power density, a predetermined torque density, a predetermined peak power range, or a predetermined maximum speed of the electric machine.

The electric machine may be particularly well suited for use in a hybrid powertrain. For example, an engine having a crankshaft may be operatively connected with the electric machine. The HV-ESS is operatively connected to the stator assembly and to a relatively high voltage electric load. The LV-ESS is operatively connected to a relatively low voltage electrical load. A DC-DC converter is operatively connected to both the HVV-ESS and the LV-ESS. A motor controller power inverter module (MPIM) is operatively connected to the stator assembly. The MPIM is configured to control the electric machine to achieve a motoring mode in which the electric machine adds torque to the crankshaft using stored electrical power from the HV-ESS. The MPIM is configured to control the electric machine to supply power to the relatively high voltage loads via the HESS and to supply power to the relatively low voltage loads through the DC-DC converter and the LV-ESS. In various embodiments the at least one barrier layer includes one or two barrier layers. For example, in the various embodiments, the at least one barrier layer includes a first barrier layer with two adjacent and discontinuous segments spaced apart from one another by a bridge of the rotor core, and arranged in a V-formation.

The electric machine may be for a powertrain in an automotive vehicle, or a non-automotive vehicle, such as a farm vehicle, a marine vehicle, an aviation vehicle, etc. It is to also be appreciated that the electric machine can be included in appliances, construction equipment, lawn equipment, etc., instead of vehicles.

The above features and advantages and other features and advantages of the present teachings are readily apparent from the following detailed description of the best modes for carrying out the present teachings when taken in connection with the accompanying drawings.

DETAILED DESCRIPTION

Figure 1:
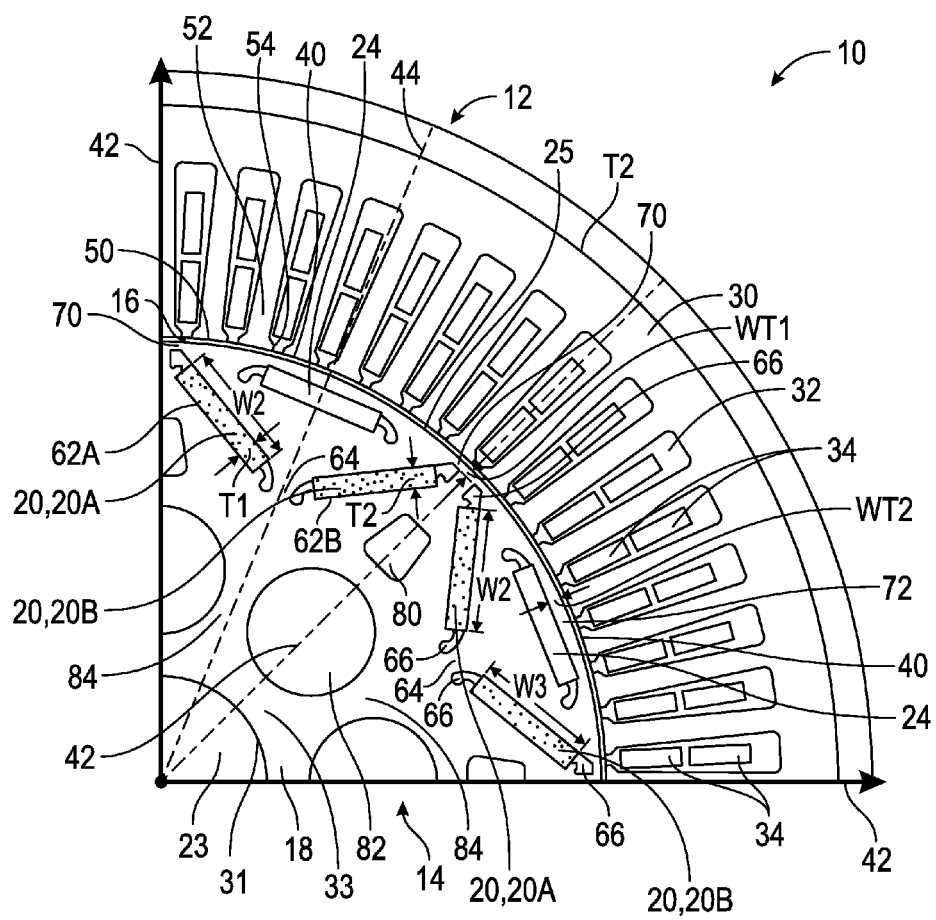
FIG. 1 is a schematic illustration in fragmentary side view of a first embodiment of an electric machine having a rotor assembly and a stator assembly in accordance with the present teachings.

Referring to the drawings, wherein like reference numbers refer to like components throughout the views, FIG. 1 shows an electric machine 10 having a stator assembly 12 and a rotor assembly 14. As discussed herein, the electric machine 10 has a multi-phase stator assembly 12 and an interior permanent magnet assisted synchronous reluctance rotor assembly 14 configured with an optimal design and geometry to satisfy predetermined operating parameters. The electric machine 10 is particularly optimized for use in a powertrain 300 (shown in FIG. 8) with a dual voltage electrical power system 317 including a first energy storage system (HV-ESS) 318A having a first nominal voltage and a second energy storage system (LV-ESS) 318B having a second nominal voltage less than the first nominal voltage. For example, the first nominal voltage may be 48 volts and the second nominal voltage may be 12 volts.

In particular, the electric machine 10 is designed to achieve a relatively high efficiency, such as 85 percent efficiency over a predetermined output power range (e.g., 1500 to 12000 watts) and speed range (e.g., 2500 revolutions per minute (rpm) to 7500 rpm) for generating mode (also referred to as regeneration mode) and 80 percent efficiency over a predetermined output power range (e.g., 1500 to 6000 watts) and speed range (e.g., 2000 rpm to 6500 rpm) for motoring mode (also referred to as torque mode), a relatively high peak power density (4 kilowatts per liter) and/or a high torque density (e.g., 18 Newton-meters (Nm) per liter), a relatively wide peak power range (e.g., 10 kilowatts between 4500 rpm and 6000 rpm), a maximum speed of at least 18,000 rpm, a relatively low cost (by minimizing the required number of permanent magnets), a relatively low mass and inertia (for fast dynamic response to driver change of mind), and to fit into a relatively small packaging space. Various alternative embodiments, including alternative electric machines 10A, 10B, and 10C (FIGS. 2-4) that can be used in place of electric machine 10 also have optimal designs and geometries to meet the predetermined operating parameters. Any of these embodiments may be used in a powertrain 300, shown in FIG. 8 in an engine belt-driven arrangement to provide engine cranking, regeneration and torque assist modes.

Figure 8:
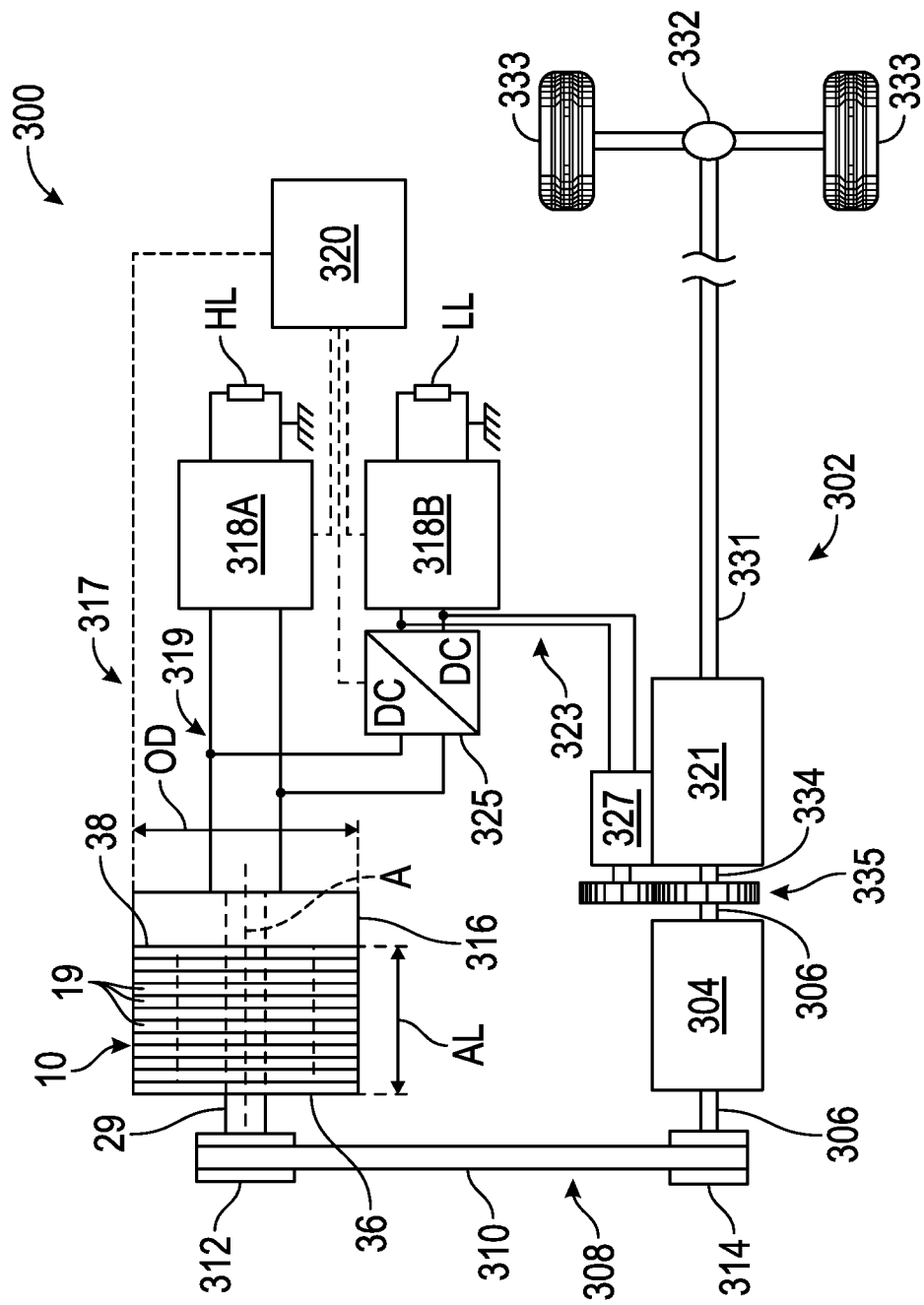
FIG. 8 is a schematic illustration of a powertrain including the electric machine of FIG. 1.

Referring to FIG. 1, the stator assembly 12 radially surrounds the rotor assembly 14 with an air gap 16 defined therebetween. The electric machine 10 is configured so that the air gap 16 is of a predetermined width in order to maximize power and minimize the number of magnets 20 housed in the rotor assembly 14. Both the stator assembly 12 and the rotor assembly 14 are generally annular in shape and are concentric about a longitudinal center axis A of the electric machine 10 (shown best in FIG. 8). The stator assembly 12 has a stator core 30 and the rotor assembly 14 has a rotor core 18. Both the stator core 30 and the rotor core 18 can be assembled from multiple laminations stacked axially along the axis A. For example, FIG. 8 shows stacks of stator laminations 19. It should be appreciated that a motor housing can radially surround an outer periphery of the stator laminations 19 and can support a motor shaft 29 of the electric machine 10. The housing is not shown in FIG. 8 so that the laminations 19 will be visible.

The rotor assembly 14 includes a rotor core 18 configured to support multiple permanent magnets 20, labelled 20A and 20B at each rotor pole. Specifically, the rotor core 18 has multiple rotor slots 22, 24, also referred to herein as barriers or barrier layers, arranged as multiple barrier layers including a first barrier layer 22, and a second barrier layer 24. The first barrier layer 22 is closest to an inner periphery 23 of the rotor core 18. The second barrier layer 24 is positioned between the first barrier layer 22 and an outer periphery 25 of the rotor core 18. The second barrier layer 24 is radially outward of the first barrier layer 22. In the embodiments shown, only the first barrier layer 22 houses magnets 20A, 20B. The other barrier layer 24 acts as an air barrier. Alternatively, in this or other embodiments, the second barrier layer 24 could be filled with magnets 20. Still further, only some of the segments of the first barrier layer 22 could be filled with magnets 20.

The rotor assembly 14 is configured to be rotatable about the axis A that extends longitudinally through the center of the electric machine 10. The rotor core 18 is rigidly connected to and rotates with a motor shaft 29 (shown only in FIG. 8) that extends through a shaft opening 31 in the rotor core 18. The material of the rotor core 18 around the shaft opening 31 functions as a center shaft support 33.

The stator assembly 12 includes a stator core 30 that has multiple circumferentially-spaced stator slots 32. The stator slots 32 extend lengthwise along the axis A. The stator slots 32 are configured to house multi-phase stator windings 34. The stator windings 34 can be grouped into different sets, each of which carry an identical number of phases of electrical current, such as three phases, as is further shown and described in FIGS. 6 and 7, and is understood by those skilled in the art. The stator windings 34 may extend axially beyond first and second axial ends 36, 38 of the stator core 30, shown in FIG. 8. The axial length AL of the stacks of laminations 19 (i.e., the distances along the axis A between the axial ends 36, 38) not including any extending portion of the windings 34 is also referred to herein as the active length of the electric machine 10. A ratio of an outer diameter OD of the laminations 19 of the stator assembly 12 to the axial length AL may be, by way of non-limiting example only, not less than 2.0 and not greater than 3.5, and, by way of non-limiting example only, with the axial length AL not exceeding 60 millimeters (mm) and the outer diameter OD not exceeding 155 mm in order to satisfy predetermined packing space requirements for a particular application of the electric machine 10, such as in a vehicle powertrain.

The rotor core 30 has eight rotor poles 40 established at least partially by the placement of the permanent magnets 20A, 20B in the first barrier layer 22 generally circumferentially disposed in the rotor core 18 and by the selected polarity of the magnets 20A, 20B. Only two of the rotor poles 40 are shown in the fragmentary quarter-view of the rotor assembly 14, and the eight rotor poles 40 are equally spaced about the rotor assembly 14 as is understood by those skilled in the art. The electric machine 10 can instead be configured to have a different number of poles 40.

Each pole 40 includes a set of the multiple barrier layers 22, 24. The poles 40 are shown separated from one another by pole boundaries 42 extending radially through the rotor core 30. Each pole 40 includes all of the material of the rotor core 30 bounded by the respective pole boundaries 42 of the pole 40. A pole axis 44 of only one of the poles 40 is shown, although each pole 40 has a similar pole axis 44 extending radially through the center of the pole 40. The number of rotor poles 40 is equal to the number of sets of barrier layers 22, 24 positioned radially outward of an equal number of spokes 84 in the rotor assembly 14. A total of eight rotor poles enables torque, power, noise, and packaging requirements to be met. The rotor core 18 is a steel material selected to maintain high speed rotational stress within predetermined limits.

In the example embodiment of FIG. 1, the stator core 30 has sixty stator slots 32 circumferentially arranged about the stator core 30 and opening at an inner periphery 50 of the stator core 30 toward the air gap 16. Stator teeth 52 separate each of the stator slots 32 and are configured with ends 54 that retain the stator windings 34. A greatest common divisor (GCD) of the number of stator slots 32 and the number of poles 40 of the rotor core 18 is the largest positive integer that divides the number of stator slots 32 and the number of poles 40 without a remainder. In the embodiment shown, because the stator core 30 has sixty stator slots 32 and the rotor core 18 has eight poles 40, the GCD is 4. In other embodiments, the GCD can be a different number.

A lowest common multiplier (LCM) of the number of stator slots 32 and the number of poles 40 is the smallest positive integer that is divisible by both the number of stator slots 32 and the number of poles 40. In the embodiment shown in FIG. 2, because the stator core 30 has sixty stator slots 32 and the rotor core 18 has eight poles 40, the LCM is 120. In other embodiments, the LCM can be a different number, and is preferably selected to minimize cogging torque due to the interaction of the permanent magnets 20 and the teeth 52 of the stator core 30. The number of stator slots 32 and the number of poles 40 may be selected so that the LCM is sufficiently large to enable a non-skewed rotor assembly such as rotor assembly 14. In other embodiments, 72, 84, 96, or 108 stator slots could be used, for example, by changing the angular spacing between adjacent stator slots 32 as is understood by those skilled in the art. The first barrier layer 22 has multiple discrete, adjacent and discontinuous segments physically separated from one another by the material of the rotor core 18 at a bridge referred to as a bottom bridge 64. Specifically, the segments include first and second wing segments 62A, 62B that are positioned at opposite ends of the bottom bridge 64 and angle away from one another toward the outer periphery 25 to establish a V-formation. In the embodiment shown, the bridge 64 is about 0.75 mm to about 2 mm wide at a narrowest portion.

Figure 5:
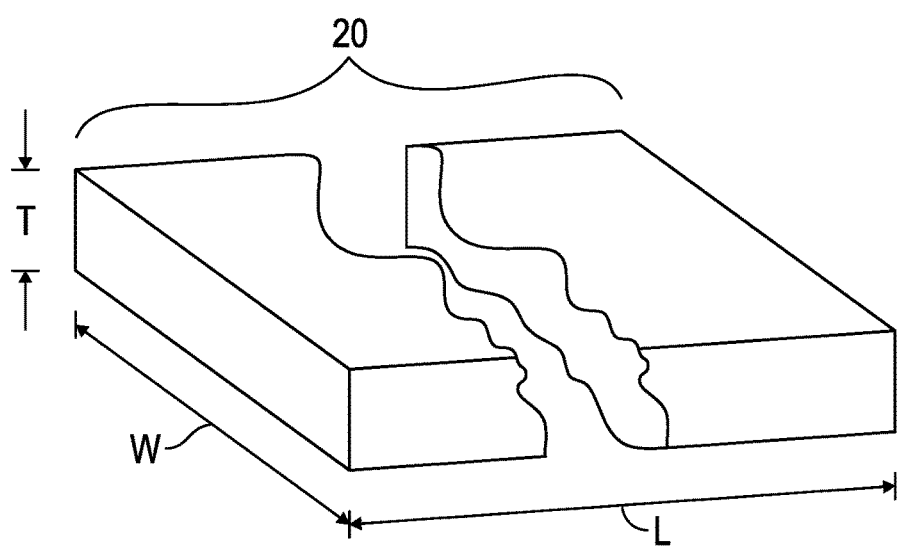
FIG. 5 is a schematic fragmentary perspective illustration of a magnet of the electric machine of FIG. 1

The second barrier layer 24 is a single slot and, in the embodiment shown, houses no magnets. Stated differently, the magnets 20 are only in the first barrier layer 22. Alternatively, the magnets 20 could be in both barrier layers 22, 24. Referring to FIGS. 1 and 5, for costs savings, it is desirable that each of the permanent magnets 20A, 20B have identical, rectangular shapes. This may be accomplished by configuring the first and second wing segments 62A, 62B to have identical thicknesses T1, T2. In one non-limiting example, the thicknesses T1, T2, enable magnets 20A, 20B with a thickness of 1.5 mm to 4 mm to be fit therein. Moreover, in the embodiments discussed herein, the total mass of the magnet material used (i.e., the mass of magnets 20) is about 150 grams to 350 grams. By using less magnetic material but still meeting predetermined operating parameters, cost is reduced. The magnets of the electric machine 10 may all be of the same material, or different ones of the magnets may be different materials.

Although the permanent magnets 20A, 20B, are rectangular in shape, the wing segments 62A, 62B have a more complex shape, with a generally rectangular middle portion which fits to and holds the magnets 20A, 20B, and air pockets 66 extending at one or both ends. The lengths of the wing segments 62A, 62B of the stacked rotor laminations in the direction of the axis A may be equal. The length of the wing segments 62A, 62B in the direction of the axis A of the stacked rotor lamination may be equal. By doing that, the permanent magnets 20A, 20B can have identical, rectangular shapes. Multiple magnets may be positioned in each of the aligned segments 62A, 62B in the direction of the length of the axis A. The length L of the magnets 20 may thus be configured so that the total number of magnets used in the aligned segments 62A, 62B stack together for a total length of 60 mm. Additionally, the widths W2, W3 of the respective first and second wing segments 62A, 62B are configured to enable magnets of greater than 5 mm in width W fit therein.

The material of the rotor core 18 also forms a first top bridge 70 between each of the first and second wing segments 62A, 62B and the outer periphery 25 of the rotor core 18. By way of non-limiting example, a minimum width WT1 of each first top bridge 70 is not less than 1 mm and not greater than 2 mm.

Additionally, the material of the rotor core 18 forms a second top bridge 72 that extends between the second barrier layer 24 and the outer periphery 25. In other words, the second top bridge 72 is the narrowest portion of each rotor pole 40 that is between first and second wing segments 62A, 62B of the rotor pole 40 and the outer periphery 25. By way of non-limiting example, a minimum width WT2 of each second top bridge 72 is not less than 0.8 mm and not greater than 2.5 mm. The magnets 20A, 20B, create the torque-producing flux in the electric machine 10 and also serve to saturate the top bridges 70, 72 to minimize a flux shunting effect. For example, a normalized flux linkage $\lambda_{rwn}$ of any of the electric machines disclosed herein at a peak torque is greater than about 0.7. The normalized flux linkage $\lambda_{rwn}$ is defined as $$\lambda_{rwn} = \frac{\lambda_m}{\sqrt{(\lambda_m + L_d * I_d)^2 + (L_q * I_q)^2}};$$

where $\lambda_m$, $L_d$ and $L_q$ are electric machine flux linkages and d, q inductances of the electric machine. The magnets 20 are a dysprosium (Dy)-reduced material with a maximum energy product from about 33 mega Gauss Oersteds (MGOe) to about 48 MGO and are configured to saturate the bridges 70, 72. As used herein, a Dy-reduced material is a magnetic material with less than 5% by weight of dysprosium.

For mass savings, the rotor core 18 has cavities 80 between adjacent wing segments 62A, 62B of adjacent sets of first barrier layers 22 of adjacent poles 40. Additional cavities 82 are positioned radially inward of the first barrier layers 22 and radially outward of the inner periphery 23. The cavities 80, 82 are in relatively low magnetic flux density regions of the rotor core 18 to reduce weight and inertia of the rotor core 18. This enables fast dynamic responsiveness of the electric machine 10, such as when a vehicle operator changes operating demands, thereby potentially increasing vehicle fuel economy.

The cavities 82 are positioned so that spokes 84 are defined by the rotor core 18 between adjacent ones of the cavities 82 and centered within each rotor pole 40. That is, the spokes 84 are centered under the bottom bridge 64. By positioning the spokes 84 so that they are centered under the bottom bridge 64, the spokes 84 are radially aligned with the poles 40 so that the center pole axis 42 of each pole 40 runs through the radial center of the respective spoke 84 under the center segment 20A. Accordingly, magnetic flux through the rotor core material of the spokes 84 aids in magnetizing the magnets 20A, 20B. The spokes 84 in the embodiment shown are non-linear in shape, as they are defined in part by the circular cavities 82. The spokes 84 extend generally radially between the portion of the rotor core 18 functioning as the center shaft support 33 and the bottom bridge 64.

By providing two barrier layers at each rotor pole 40, the reluctance torque of the electric machine 10 is high, which helps to minimize cost. Additionally, the radially-innermost barrier layer 22 is fully or partially filled with magnets 20. A layer is "fully" filled with magnets 20 if each segment of the layer houses a magnet 20, and is only partially filled with magnets 20, if at least one of the segments of the layer is empty. By providing magnets 20 in only some of the barrier layers, costs are minimized.

Figure 2:
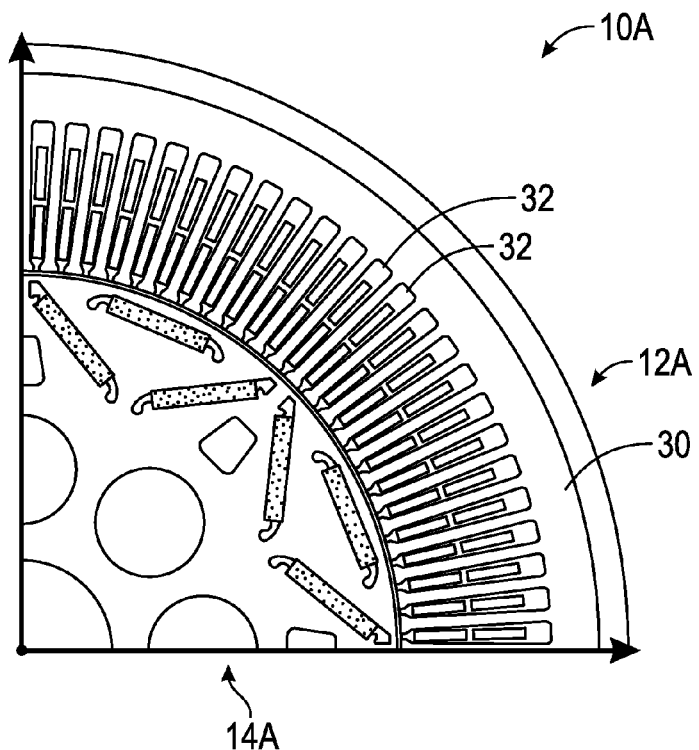
FIG. 2 is a schematic illustration in fragmentary side view of a second embodiment of an electric machine having a rotor assembly and a stator assembly in accordance with the present teachings.

FIG. 2 shows an alternative electric machine 10A that can be used in place of the electric machine 10 in the powertrain 300 of FIG. 20. The electric machine 10A has a stator assembly 12A identical to that of electric machine 10 except that a total of 96 stator slots 32 are circumferentially spaced about the stator assembly 12A. In other embodiments, 60, 72, 84, or 108 stator slots could be used, for example, by changing the angular spacing between adjacent stator slots 32 as is understood by those skilled in the art. The electric machine 10A has a rotor assembly 14A identical to the rotor assembly 14 of electric machine 10 except that additional magnets 20 fill the second barrier layer 24. In other words, in the electric machine 10, only the radially-innermost (first) barrier layer 22 is filled with magnets 20A, 20B. In contrast, in the rotor assembly 14A of the electric machine 10A, the first and second barrier layers 22 and 24 hold magnets. The rotor core 30 of the electric machine 10A is identical to that of electric machine 10, and has eight rotor poles 40.

Figure 3:
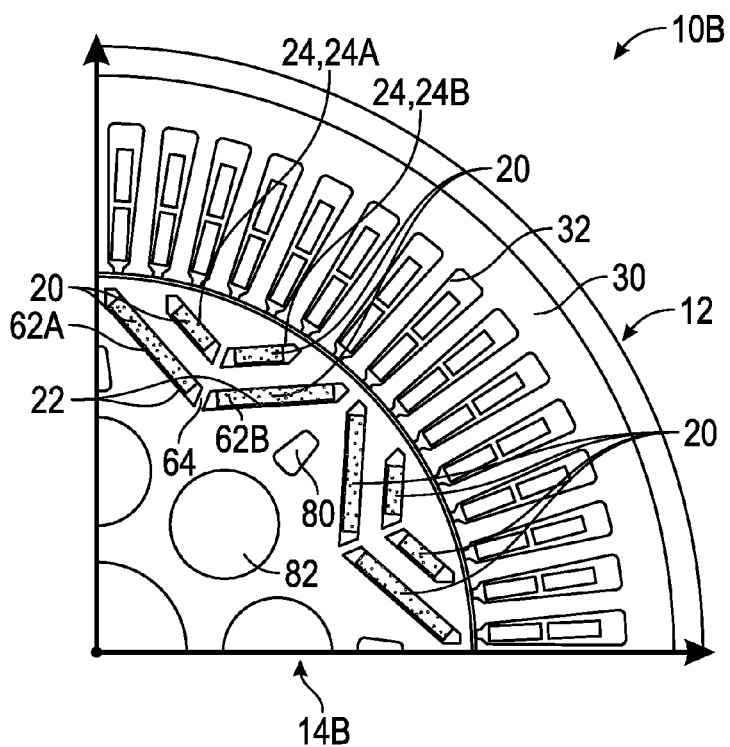
FIG. 3 is a schematic illustration in fragmentary side view of a third embodiment of an electric machine having a rotor assembly and a stator assembly in accordance with the present teachings.

FIG. 3 shows an alternative electric machine 10B that can be used in place of the electric machine 10 in the powertrain 300 of FIG. 20. The electric machine 10B has a stator assembly 12 identical to that of the electric machine 10, and a rotor assembly 14B identical to the rotor assembly 14 of FIG. 12, except that the rotor assembly has a second barrier layer 24 at each rotor pole 40 that includes two adjacent and discontinuous segments 24A, 24B spaced apart from one another and arranged in a V-formation. Such an arrangement may be referred to as a "double V" machine, as both the first barrier layer 22 and the second barrier layer 24 are in a V-formation. Like the first barrier layer 22, the rotor core 30 forms a bottom bridge 64 between the adjacent segments 24A, 24B that is about 0.75 mm to 2 mm in width. Magnets 20 are disposed in both the first barrier layer 22 and the second barrier layer 24. Magnets may be disposed in some or all of the segments 24A, 24B of the second barrier layer 24 in addition to the first barrier layer 22. Alternatively, magnets 20 may be disposed only in some or all of the segments 62A, 62B of the first barrier layer 22 and the second barrier layer 24 may be empty. Accordingly, the electric machine 10B is an eight rotor pole 40, 60 stator slot 32, double V electric machine. In other embodiments, 72, 84, 96, or 108 stator slots could be used, for example, by changing the angular spacing between adjacent stator slots 32 as is understood by those skilled in the art.

Figure 4:
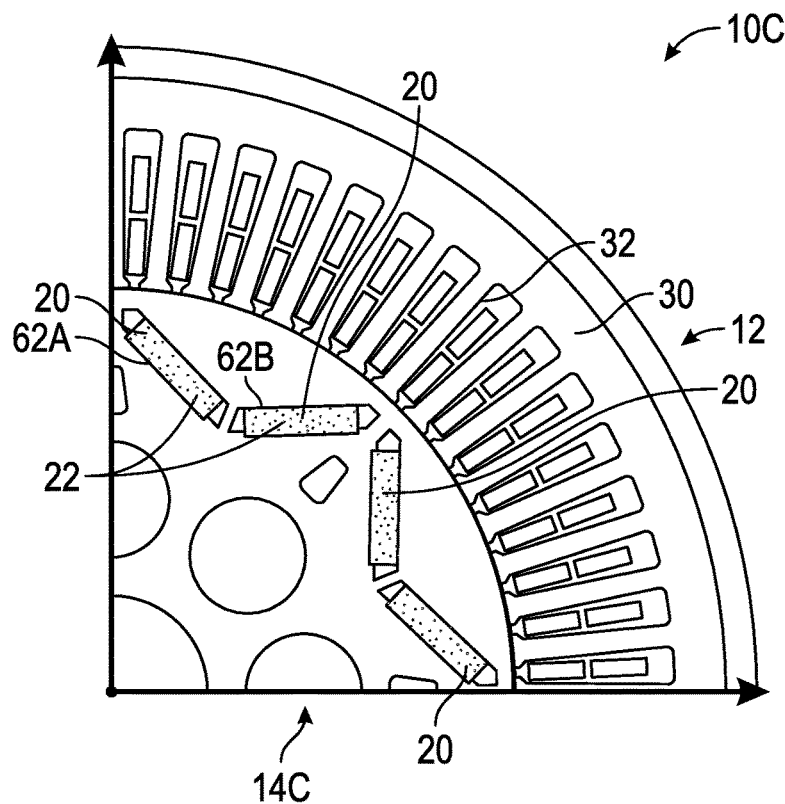
FIG. 4 is a schematic illustration in fragmentary side view of a fourth embodiment of an electric machine having a rotor assembly and a stator assembly in accordance with the present teachings.

FIG. 4 shows an electric machine 10C with a rotor assembly 14C identical to the rotor assembly 14B of electric machine 10B of FIG. 3 except that there is no second barrier layer 24. Accordingly, the rotor assembly 14C has only the first barrier layer 22. Such an arrangement may be referred to as a "single V" machine. Magnets 20 are shown disposed in both segments 62A, 62B of the first barrier layer 22. Alternatively, magnets 20 may be disposed in less than all of the first and second segments 62A, 62B at the eight rotor poles 40. For example, magnets 20 could be disposed only in the first segments 62A, only in the second segments 62B, or only in the first segments 62A in some of the rotor poles 40 and only in the second rotor segments 62B in others of the rotors poles 40. Accordingly, the electric machine 10C is an eight rotor pole 40, 60 stator slot 32, single V electric machine. In other embodiments, 72, 84, 96, or 108 stator slots could be used, for example, by changing the angular spacing between adjacent stator slots 32 as is understood by those skilled in the art.

Figure 6:
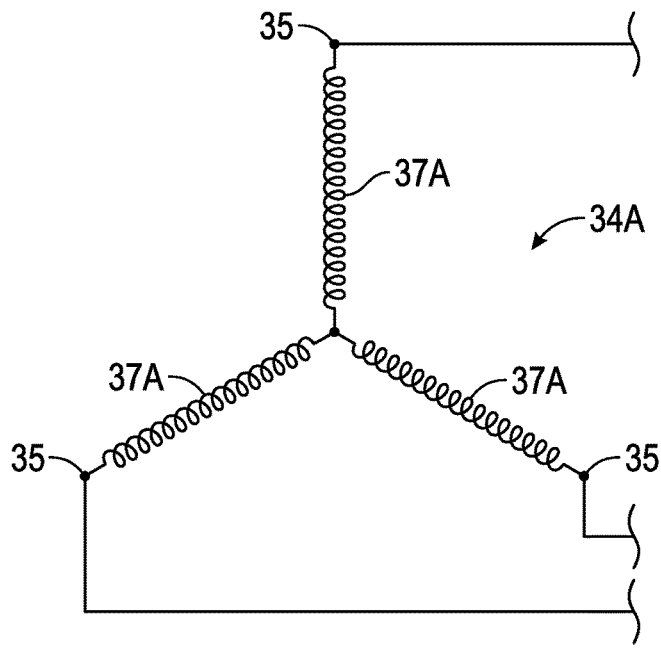
FIG. 6 is a schematic illustration of a first embodiment of three phase windings for a stator assembly in accordance with the present teachings.
Figure 7:
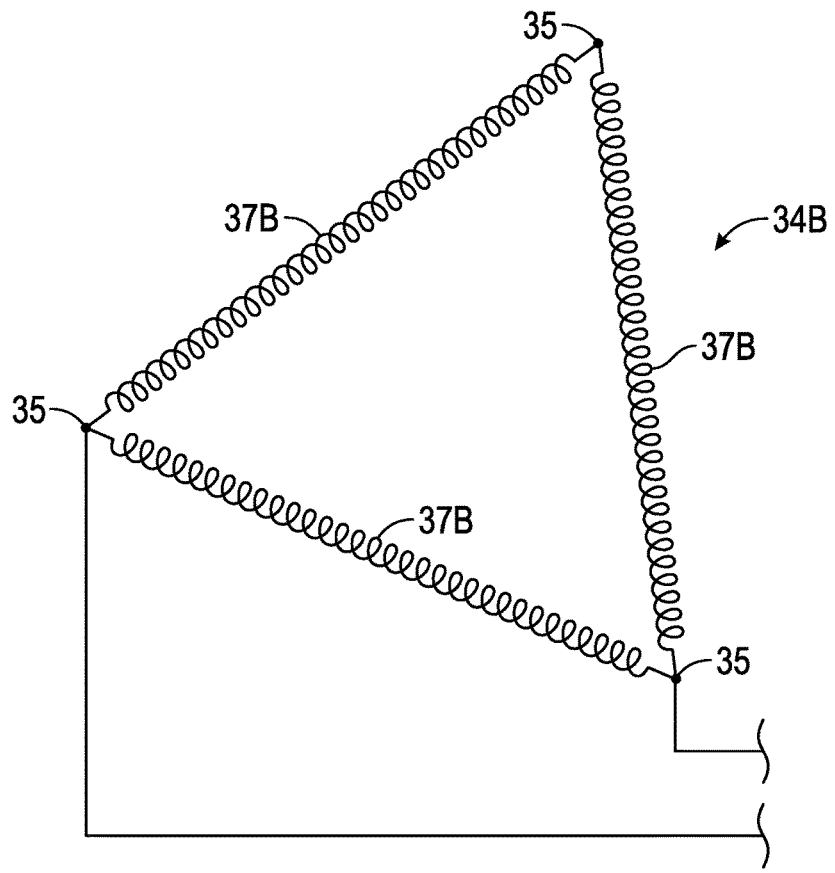
FIG. 7 is a schematic illustration of a second embodiment of three phase windings for a stator assembly in accordance with the present teachings.

FIGS. 6 and 7 show various embodiments of multi-phase stator windings 34A, 34B any of which can be used as the stator windings 34 in the stator slots 32 of any of the electric machines and stator assemblies discussed herein. Additionally, multi-phase stator windings with other configurations may be used within the scope of the present teachings. Stator winding 34A shown in FIG. 6 is a three phase stator winding with three terminals 35 arranged in a star configuration (also referred to as Y or wye configuration). Stator winding 34A is shown with 16 turns per coil 37A, but may have anywhere from 12 to 32 turns per coil.

Stator winding 34B shown in FIG. 7 is a three phase stator winding with three terminals 35 arranged in a delta configuration. Stator winding 34B is shown with 32 turns per coil 37B, but may have anywhere from 12 to 32 turns per coil.

The electric motor 10, 10A, 10B, or 10C with any of the various stator assemblies 12 or 12A, with any of the various stator windings 34A, or 34B, and any of the various rotor assemblies 14, 14A, 14B, or 14C, in any combination, can be used in many applications, such as on a vehicle. One non-limiting example use is shown in FIG. 8, where the electric motor 10 is included in the powertrain 300 of vehicle 302. Although shown as electric motor 10, any of the electric motors 10, 10A, 10B, or 10C with any of the various stator assemblies 12 or 12A, with any of the various stator windings 34A, or 34B, and any of the various rotor assemblies 14, 14A, 14B, or 14C, in any combination, can be used in the powertrain 300.

The powertrain 300 also includes an engine 304 having a crankshaft 306. A belt drive train 308 operatively connects the electric machine 10 with the crankshaft 306. A selectively engageable clutch may be included to connect and disconnect the engine crankshaft 306 from the belt drive train 308 and therefore from the electric machine 10. The powertrain 300 is a hybrid powertrain and more specifically, a fossil fuel-electric hybrid powertrain because, in addition to the engine 304 as a first power source powered by fossil fuel, such as gasoline or diesel fuel, the electric machine 10 powered by stored electrical energy is available as a second power source. The electric machine 10 is controllable to function as a motor or as a generator and is operatively connectable to the crankshaft 306 of the engine 304 via the belt drive train 308 (when the selectively engageable clutch is engaged if such a clutch is provided). The belt drive train 308 includes a belt 310 that engages with a pulley 312. The selectively engageable clutch may be between the pulley 312 and the motor shaft 29 so that the pulley 312 is connected to and rotates with the motor shaft 29 of the electric motor 10 only when the selectively engageable clutch is engaged. The belt 310 also engages with a pulley 314 connectable to rotate with the crankshaft 306. When the pulley 312 is connected to rotate with the electric machine 10 and the pulley 314 is connected to rotate with the crankshaft 306, the belt drive train 308 establishes a driving connection between the electric machine 10 and the crankshaft 306. The electric machine 10 may be referred to as a belt-alternator-starter motor/generator in this arrangement.

Alternatively, the belt drive train 308 may include a chain in lieu of the belt 310 and sprockets in lieu of the pulleys 312, 314. Both such embodiments of the belt drive train 308 are referred to herein as a "belt drive train". The crankshaft 306 is also operatively connected to a transmission 321. Clutches or other torque-transmitting mechanisms (not shown) may be positioned between the engine 304 and the transmission 321. The transmission 321 has an output shaft 331 operatively connected to drive vehicle wheels 333. A gearing arrangement 335 may be positioned between an optional starter motor 327 and the crankshaft 306.

A motor controller power inverter module (MPIM) 316 is operatively connected to the stator assembly 12. As shown, the MPIM 316 is mounted directly to the electric machine 10 and is integrated in the electric machine 10. The MPIM 316 is operable to convert between alternating current and direct current. More specifically, the MPIM 316 converts between multiphase alternating current to relatively high voltage direct current on a high voltage bus 319 for the HV-ESS 318A. The HV-ESS 318A has a nominal voltage of 48 volts and is operatively connected to and powers a relatively high voltage load HL, and the electric machine 10. Potential components of the high voltage load HL may include a generator, an electric water pump, a condenser/radiator fan module, a DC/DC converter 325, a power steering system, a heating system (such as a positive temperature coefficient heater), a rear window defogger, a catalytic converter, a powered suspension system, and an electronic turbocharger.

A DC/DC converter 325 converts between direct current from a relatively high voltage level (provided by the electric machine 10) on the high voltage bus 319 to a relatively low voltage level on the low voltage bus 323, and from the low voltage level (provided by the LV-ESS 318B) on the low voltage bus 323 to the high voltage level on the high voltage bus 319. The DC/DC converter may be configured with an efficiency greater than 95 percent. The LV-ESS 318B has a nominal voltage of 12 volts and is operatively connected to and powers a relatively low voltage load, such as the optional starter motor 327 for the engine 304, and a relatively low voltage load LL, such as a vehicle auxiliary load that may include interior and exterior lighting systems, heating and cooling systems, etc.

One or more additional controllers 320 are operatively connected to the MPIM 316, the engine 304, the transmission 321, the DC/DC converter 325, the HV-ESS 318A and the LV-ESS 318B, and the clutches (not shown), such as by electronic connections. The operative connections to the engine 304, transmission 321 and any clutches are not shown for purposes of clarity in the drawings.

Figure 9:
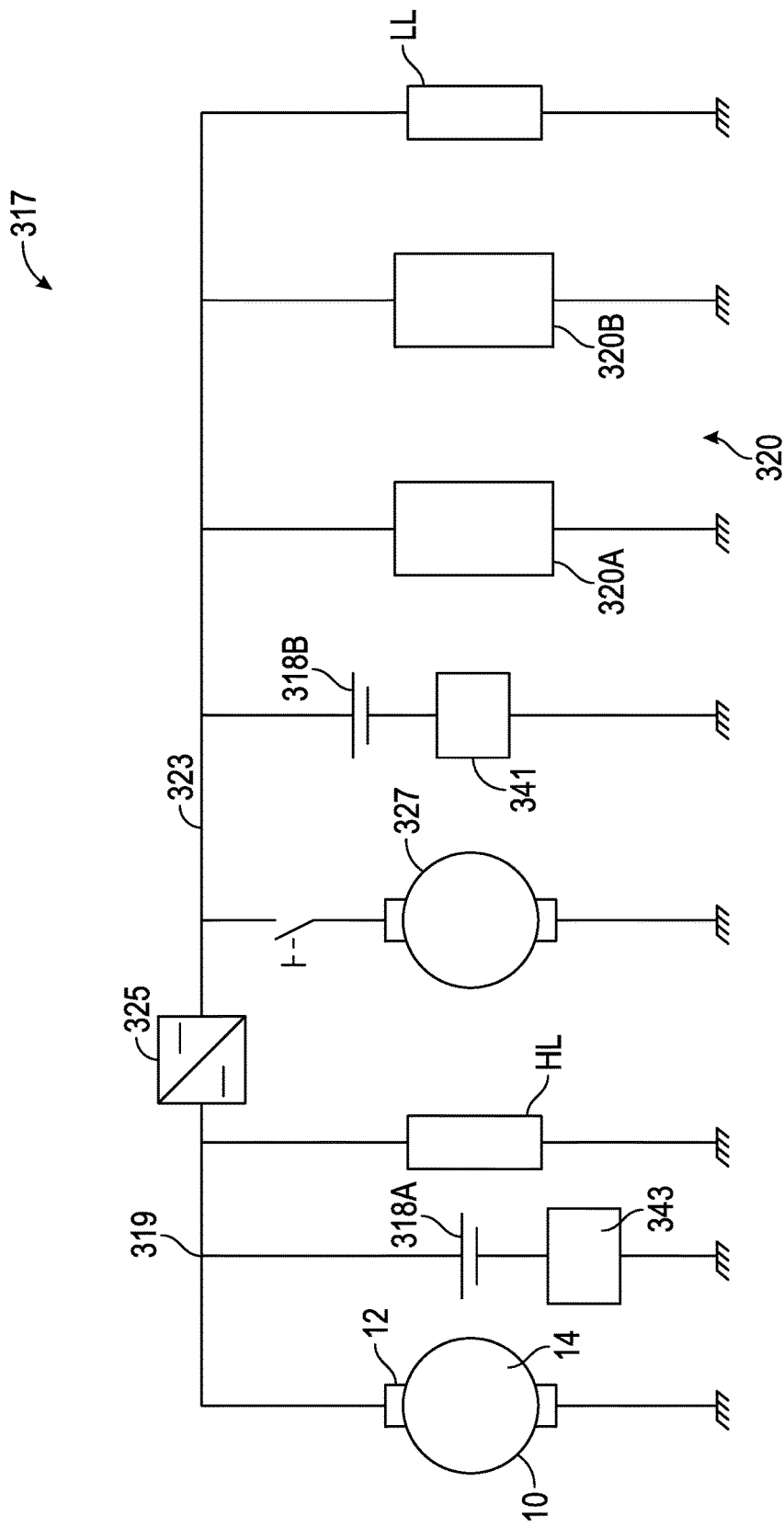
FIG. 9 is a schematic illustration of the powertrain of FIG. 8 depicting an arrangement of the electrical system.

The dual voltage electrical power system 317 with the electric machine 10 is shown schematically in FIG. 9. The one or more controllers 320 are depicted as a body control module 320A, and an engine control module 320B. In the embodiment shown, hybrid controls (e.g., a processor to command various available hybrid operating modes) are included in the engine control module 320B. Alternatively, a hybrid controller including a hybrid control processor may be in a separate, stand-alone hybrid control module. An integrated battery sensor 341 is operatively connected to the LV-ESS 318B. A battery management system 343 is operatively connected to the HV-ESS 318A.

When any necessary clutches (not shown) are engaged, and assuming the transmission 321 is controlled to establish a driving connection between the transmission input member 334 and the transmission output member (output shaft 331), torque transfer can occur between the crankshaft 306 and vehicle wheels 331 through the transmission 321 and through a differential 332.

Under predetermined operating conditions, the MPIM 316 can control the electric machine 10 to function as a motor. The electric machine 10 can then drive the crankshaft 306 to start the engine 304. When the engine 304 is on, and when predetermined operating conditions are met, the MPIM 316 is configured to control the stator assembly 12 to achieve a motoring mode in which the electric machine 10 adds torque to the crankshaft 306 using stored electrical power from the HV-ESS 318A and potentially from the LV-ESS 318B via the DC/DC converter 325. This may be referred to as a torque assist mode. The electric motor 10 adds torque through the belt drive train 308 with any optional clutch between the drivetrain 308 and the electric machine 10 engaged. When the engine 304 is on and other predetermined operating conditions are met, the MPIM 316 is configured to control power flow in the stator assembly 12 to achieve a generating mode in which the electric machine 10 converts torque of the crankshaft 306 into stored electrical power in the HV-ESS 318A. Operation of the electric machine 10 as a generator slows the crankshaft 306. For example, the generating mode may be established during vehicle braking.

Figure 13:
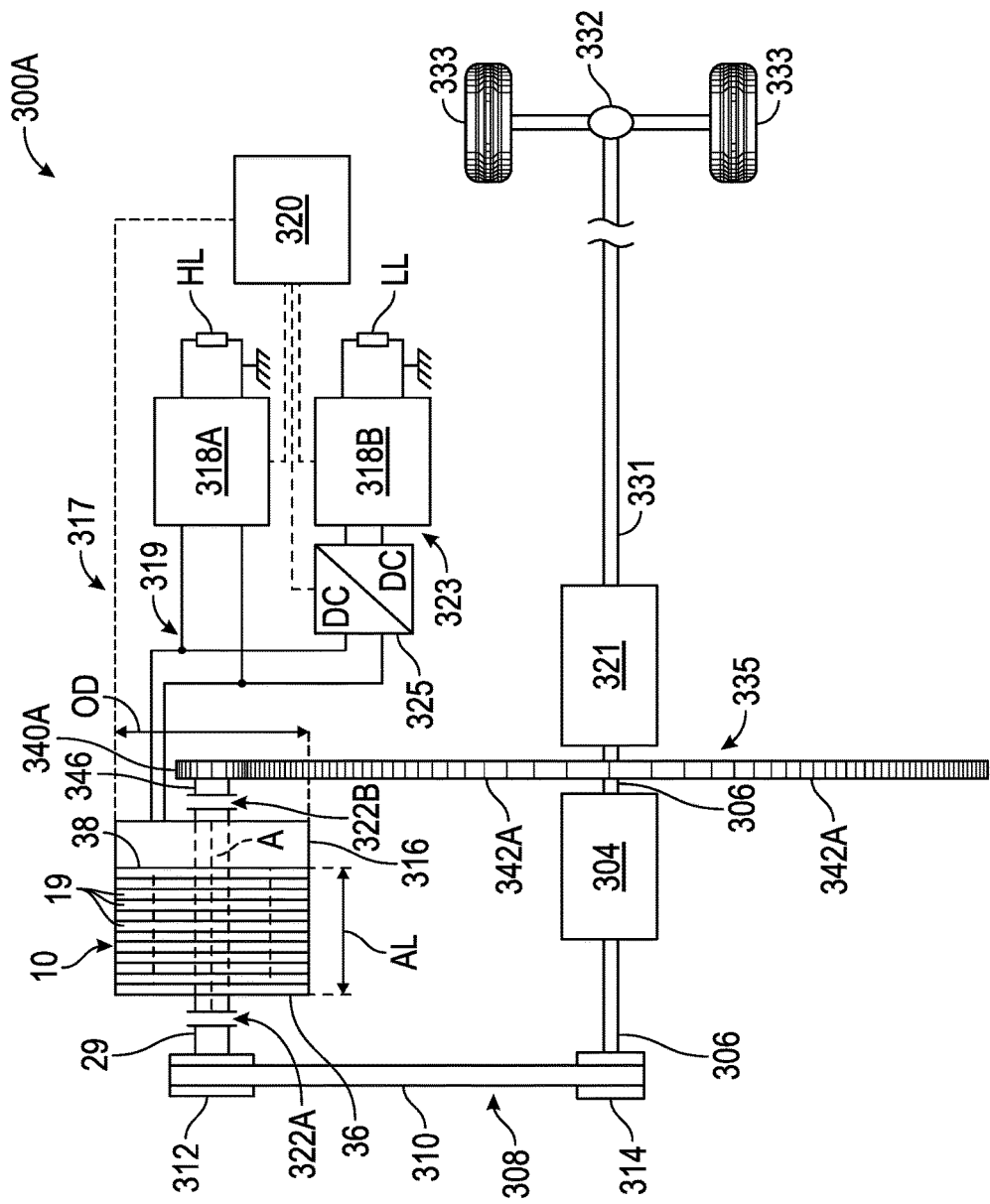
FIG. 13 is a schematic illustration of an alternative embodiment of a powertrain including the electric machine of FIG. 1 in accordance with the present teachings.

FIG. 13 shows another embodiment of a powertrain 300A with the electric machine 10 and the dual voltage electrical power system 317. The belt drive train 308 operatively connects the electric machine 10 with the crankshaft 306 only when a selectively engageable clutch 322A is engaged. Under predetermined operating conditions, the controller 320 can cause a clutch 322B to be engaged, and the MPIM 316 can control the electric machine 10 to function as a motor. The electric machine 10 can then drive the crankshaft 306 via intermeshing gears 340A, 342A of a gearing arrangement 335 to start the engine 304. Gear 340A is mounted on and rotates with a shaft 346 that rotates with the motor shaft 29 when clutch 322B is engaged. Gear 342A is mounted on and rotates with the crankshaft 306. Clutch 322A is not engaged during cranking of the engine 304. The optional starter motor 327 of FIG. 8 is not provided in the powertrain 300A. The operative connections to the engine 304, transmission 321 and clutches 322A, 322B are not shown for purposes of clarity in the drawings. The connections to the transmission 321 and clutches 322A, 322B may be electronic, hydraulic, or otherwise. The components of powertrain 300A otherwise function as described with respect to the like numbered components of powertrain 300.

Figure 14:
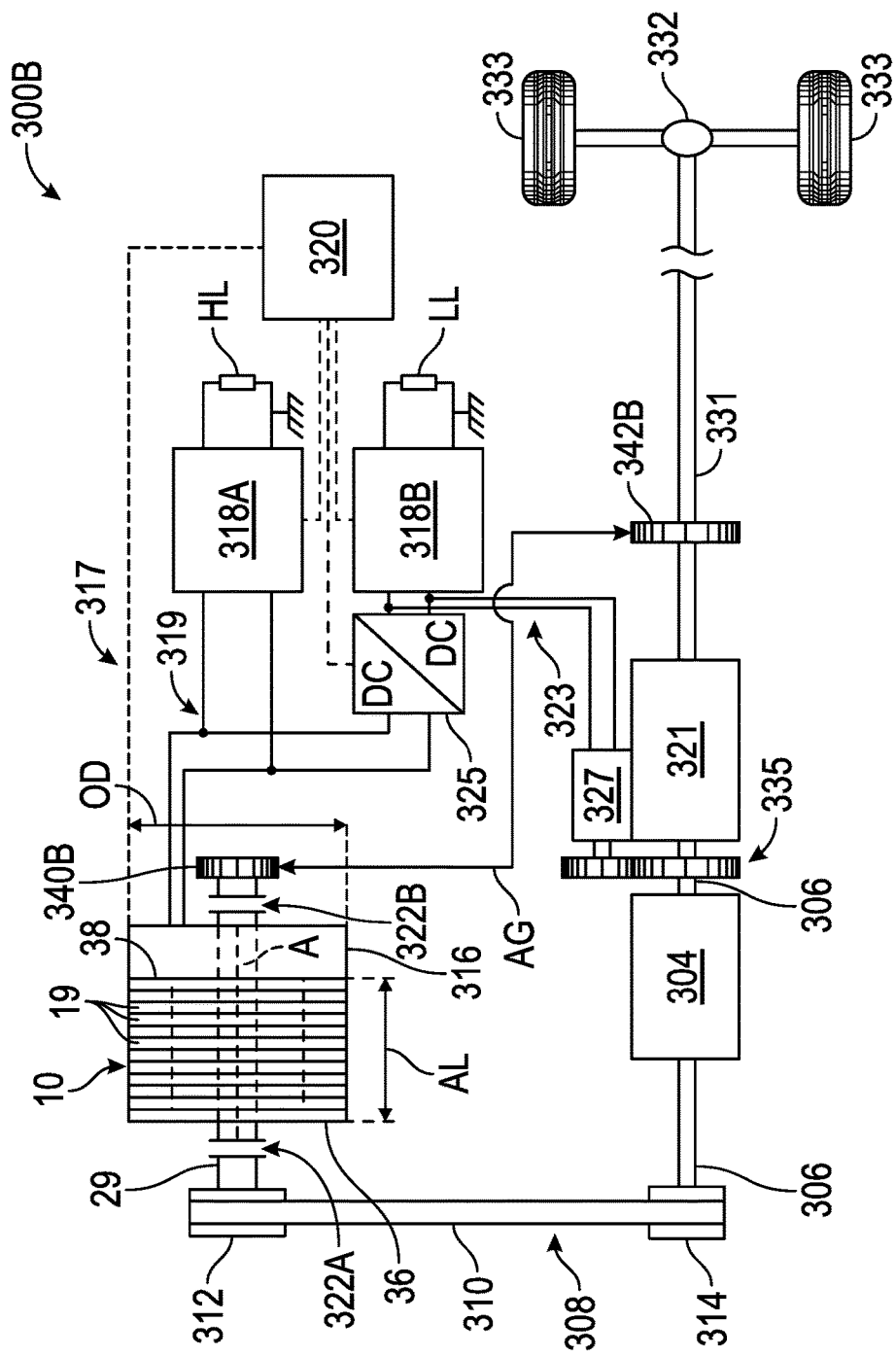
FIG. 14 is a schematic illustration of an alternative embodiment of a powertrain including the electric machine of FIG. 1 in accordance with the present teachings.

FIG. 14 shows another embodiment of a powertrain 300B with the electric machine 10 and the dual voltage electrical power system 317. The powertrain 300B includes the clutches 322A, 322B that are controlled to function as described with respect to powertrain 300A. In the powertrain 300B, the starter motor 327 and the intermeshing gears 335 are included for starting the engine 304 under predetermined operating conditions. A gear 340B rotates with the rotor of the electric machine 10 when the clutch 322B is engaged. The gear 340B meshes with a gear 342B that is mounted on and rotates with the transmission output shaft 331. The meshing arrangement of the gears 340B, 342B is indicated by double-sided arrow AG. The powertrain 300B is shown only schematically and in two-dimensions in FIG. 14. The components may be of a different scale than shown to accomplish meshing of gears 340B, 342B.

Figure 10:
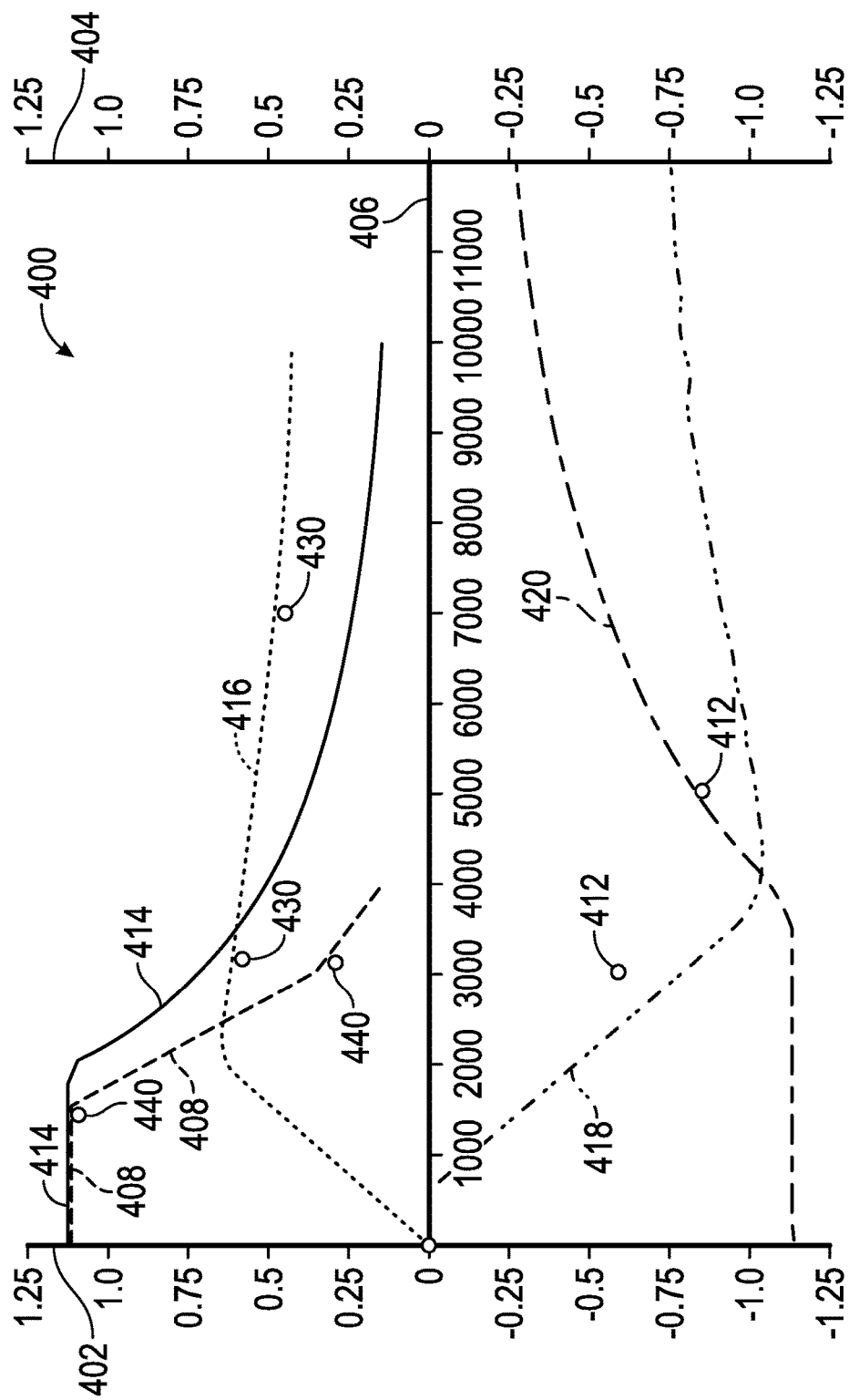
FIG. 10 is a plot of torque per unit of base torque (pu) and power per unit of base power (pu) versus speed (revolutions per minute) of an electric machine in accordance with the present teachings.

In the powertrain application shown in FIG. 8 or in other vehicle powertrain applications, the electric machine 10A of FIG. 2 is configured to achieve at least 85% efficiency over a predefined output power and speed range for regeneration mode as illustrated in FIG. 10. The predefined output power range is 1500 to 12000 watts, and the predefined speed range is 1800 to 9000 rpm. The electric machine 10A of FIG. 2 is configured to achieve at least 80% efficiency over a predefined output power and speed range for motoring mode as illustrated in FIG. 10. The predefined output power range is 1800 to 6000 watts, and the predefined speed range is 2000 to 7500 rpm. The electric machine 10A is configured to have a maximum speed of at least 18,000 revolutions per minute.

Referring to FIG. 10, a plot 400 shows torque of the electric machine 10A per unit of base torque (pu) on the left-side vertical axis 402. Power of the electric machine 10A per unit of base power (pu) is shown on the right side vertical axis 404. Speed of the rotor assembly 14 in revolutions per minute (rpm) is shown on the horizontal axis 406. Some of the predetermined operating parameters that the geometry of the electric machine 10A is specifically designed to satisfy include a motoring peak torque requirement 408 (motoring mode torques requirement shown as points 440), a motoring power requirement (motoring mode power requirements shown as points 430), and a generating power requirement 412. Motoring torque 414 theoretically achievable by the electric machine 10A exceeds the motoring peak torque requirement 408. Motoring power 416 theoretically achievable by the electric machine 10A exceeds the motoring power requirement. The magnitude of the generating power 418 theoretically achievable by the electric machine 10A exceeds the generating power requirement 412. Generating torque 420 is also shown, and extends at least to a speed of the electric machine 10A of 12,000 rpm. A saliency ratio of the electric machine 10, 10A, 10B or 10C at a rated torque of the electric machine is not less than 1.5 and not greater than 3.0. As is understood by those skilled in the art, the saliency ratio is the ratio of inductance in the d-axis of the electric machine to the inductance in the q-axis of the electric machine. The d-axis is the axis of the electric machine with the highest inductance, and the q-axis is the axis of the electric machine with the lowest inductance.

Figure 11:
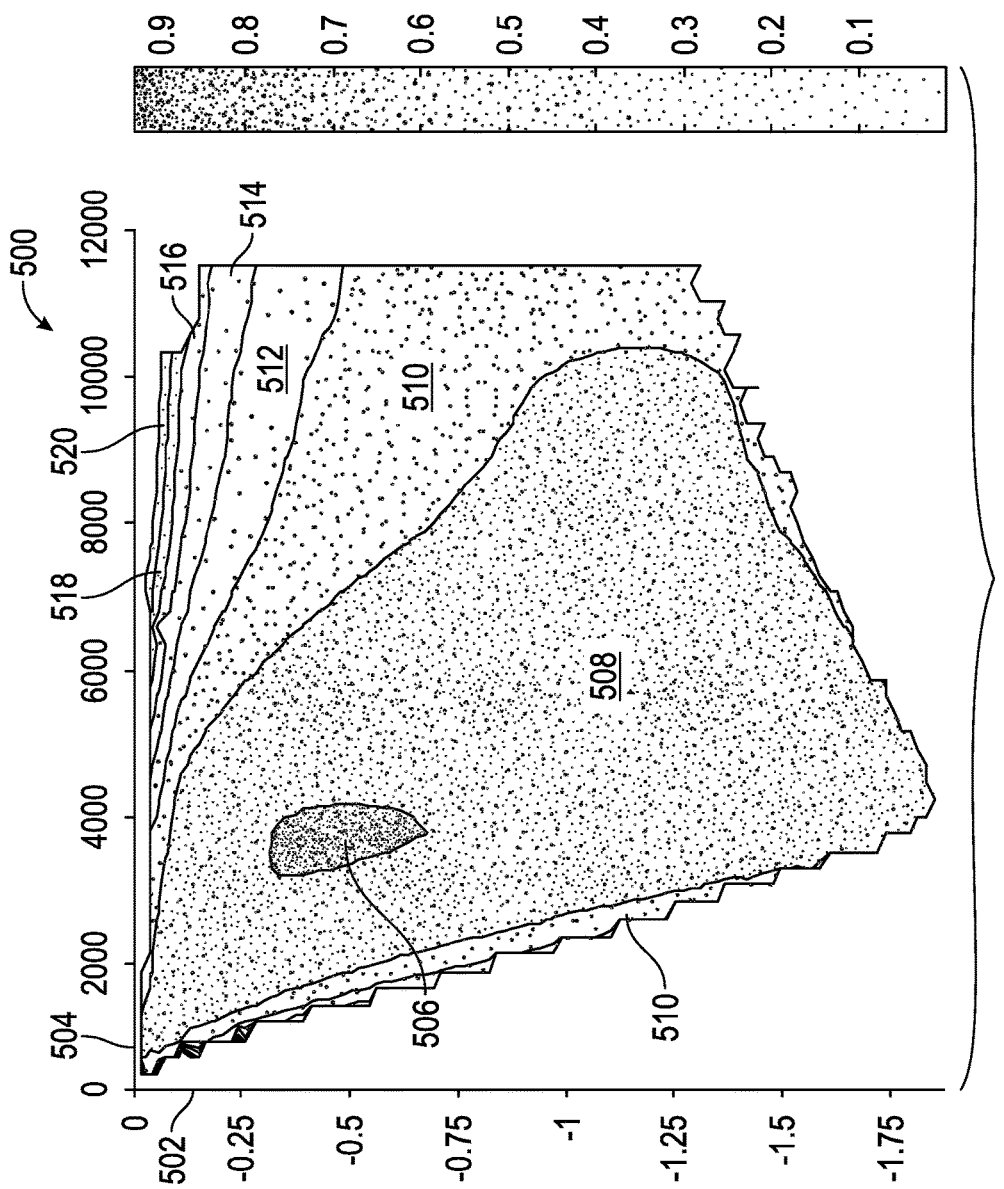
FIG. 11 is an efficiency map at different powers per unit of base power (pu) and speeds (revolutions per minute) during a generating mode of an electric machine in accordance with the present teachings.

FIG. 11 shows a map 500 of the efficiency of the electric machine 10A when operating in a 14 volt generating mode. Power of the electric machine 10A per unit of base power (pu) is shown on the vertical axis 502. Speed of the electric machine 10A in rpm is shown on the horizontal axis 504. Regions of different operating efficiencies of the electric machine 10A are shown bounded by dashed lines including: a 94% operating efficiency zone 506; an 85% operating efficiency zone 508; a 75% operating efficiency zone 510; a 65% operating efficiency zone 512; an 60% operating efficiency zone 514; a 50% operating efficiency zone 516; a 30% operating efficiency zone 518; and an approximately 10% operating efficiency zone 520.

Figure 12:
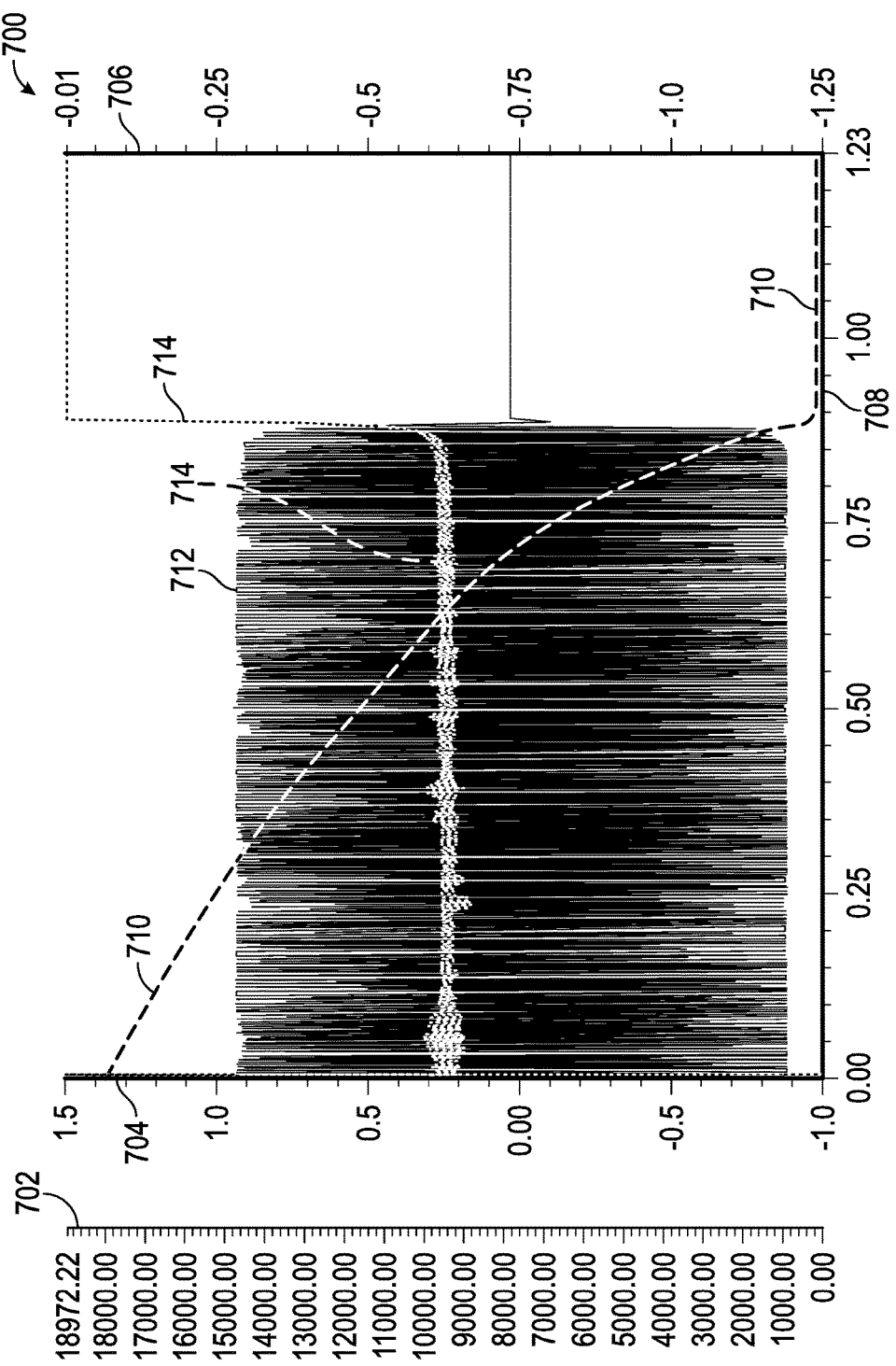
FIG. 12 is a plot of rotor speed (revolutions per minute), power per unit of base power (pu) and phase A current per unit of base current (pu) versus time (seconds) during a three-phase short circuit event of an electric machine in accordance with the present teachings.

FIG. 12 is a plot 700 of the rotational speed in rpm of the rotor assembly 14A in rpm on the far left vertical axis 702, a phase A current per unit of base current (pu) in the windings 34 of stator assembly 12A on the other left-side vertical axis 704, power of the electric machine 10 per unit of base power (pu) on the right side vertical axis 706, and time in seconds on the horizontal axis 708 during a three-phase short circuit event. The short circuit event occurs by connecting the phases of the windings 34 together while the rotor assembly 14A is free spinning (i.e., without torque on the motor shaft 29) at high speeds, such as greater than 4000 rpm. The resulting speed of the rotor assembly 14A is shown by curve 710. The phase current of phase A is shown by curve 712. The power loss in the electric machine 10A is shown by curve 714. In the exemplary embodiment shown in FIG. 12, the actual short circuit current is not less than a predetermined value, for example, 0.6 multiplied by the rated current of the electric machine 10, and not more than a predetermined value, for example 0.9 multiplied by the rated current of the electric machine 10. For example, in the embodiment providing the short circuit performance shown in FIG. 12, the rated current is 330 root mean square Amps (Arms) and the maximum short circuit current is 268 Arms.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An electric machine for a dual voltage power system having a first energy storage system (HV-ESS) with a first nominal voltage and second energy storage system (LV-ESS) with a second nominal voltage, the electric machine comprising:
   a rotor assembly having a rotor core configured to support permanent magnets spaced around the rotor core to define a number of rotor poles;
   wherein the rotor core has multiple rotor slots arranged as at least one barrier layer at each of the rotor poles; wherein the at least one barrier layer is positioned between an inner periphery of the rotor core and an outer periphery of the rotor core;
   permanent magnets disposed in the at least one barrier layer;
   a stator assembly surrounding the rotor assembly;
   wherein the electric machine is configured to be operatively connected with the HV-ESS to function as at least one of a motor and a generator;
   wherein the rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine; and
   wherein the predetermined efficiency is at least 85 percent efficiency over 2500 revolutions per minute (rpm) to 7000 rpm for power from 1500 watts to 12000 watts, the predetermined peak power density is 4 kilowatts per liter (kW/L), the predetermined peak torque density is 18 Newton-meters per liter (Nm/L), the predetermined peak power range is 10 kilowatts (kW) from 4500 rpm to 6000 rpm, and the predetermined maximum speed is at least 18,000 rpm.

2. The electric machine of claim 1, further comprising:
   a motor controller power inverter module (MPIM) operatively connected to the stator assembly.

3. The electric machine of claim 2, in combination with:
   an engine having a crankshaft operatively connected with the electric machine;
   the dual voltage power system including:
      the HV-ESS operatively connected to the stator assembly and to a relatively high voltage electric load;
      the LV-ESS operatively connected to a relatively low voltage electrical load;
      a DC-DC converter operatively connected to both the HVV-ESS and the LV-ESS;
   wherein the MPIM is configured to control the electric machine to achieve a motoring mode in which the electric machine adds torque to the crankshaft using stored electrical power from the HV-ESS;

wherein the MPIM is configured to control the electric machine to supply power to the relatively high voltage loads via the HESS and to supply power to the relatively low voltage loads through the DC-DC converter and the LV-ESS.

4. The electric machine of claim 1, wherein the at least one barrier layer includes a first barrier layer with two adjacent and discontinuous segments spaced apart from one another by a bridge of the rotor core, and arranged in a V-formation.

5. The electric machine of claim 4, wherein the at least one barrier layer includes:
a second barrier layer positioned between the first barrier layer and an outer periphery of the rotor core.

6. The electric machine of claim 5, wherein the second barrier layer is a single slot.

7. The electric machine of claim 5, wherein the second barrier layer includes two adjacent and discontinuous segments spaced apart from one another and arranged in a V-formation.

8. The electric machine of claim 5, wherein the permanent magnets are only in the first barrier layer.

9. The electric machine of claim 5, wherein the permanent magnets are in both the first barrier layer and the second barrier layer.

10. The electric machine of claim 1, wherein the stator assembly has a number of stator slots circumferentially-spaced around the stator assembly and configured to support stator windings; wherein the number of rotor poles is 8 and the number of stator slots is 60.

11. The electric machine of claim 1, wherein the stator assembly has a number of stator slots circumferentially-spaced around the stator assembly and configured to support stator windings; wherein the number of rotor poles is 8 and the number of stator slots is 96.

12. The electric machine of claim 1, wherein the permanent magnets are a dysprosium (Dy)-reduced material with a maximum energy product from about 33 mega Gauss Oersteds (MGOe) to about 48 MGOe and are configured to saturate a bridge of the rotor core between the at least one barrier layer and the outer periphery of the rotor core.

13. The electric machine of claim 1, wherein the stator assembly has at least three electrical phases, and the number of turns in electrical windings per each of said electrical phases is not less than 12 and not more than 32.

14. The electric machine of claim 1, wherein the stator assembly has multiple axially-stacked stator laminations; and
wherein a ratio of an outer diameter of the stator laminations to an axial length of the stator laminations is not less than 2.0 and not greater than 3.5.

15. The electric machine of claim 14, wherein the outer diameter of the stator laminations is not greater than 155 millimeters and the axial length of the stator laminations is not greater than 60 millimeters.

16. The electric machine of claim 1, wherein a short circuit current over an entire speed range of the electric machine is not less than 0.6 and not more than 0.9 multiplied by a rated current of the electric machine.

17. The electric machine of claim 1, wherein a normalized flux linkage at a peak torque of the electric machine is greater than 0.7.

18. The electric machine of claim 1, wherein a saliency ratio of the electric machine at a rated torque of the electric machine is not less than 1.5 and not greater than 3.0.

19. A powertrain comprising:
an electric machine having a rotor assembly with permanent magnets, a stator assembly, and a motor controller power inverter module (MPIM) operatively connected to the stator assembly;
an engine having a crankshaft operatively connected with the electric machine by a belt drive train;
a dual voltage power system having:
a first energy storage system (HV-ESS) with a first nominal voltage;
a second energy storage system (LV-ESS) with a second nominal voltage);
a DC-DC converter operatively connected to both the HV-ESS and the LV-ESS;
a first electric load operatively connected with the HV-ESS;
a second electrical load operatively connected with the LV-ESS;
wherein the MPIM is configured to control the stator assembly to achieve a motoring mode in which the electric machine adds torque to the crankshaft using stored electrical power from the HV-ESS;
wherein the MPIM is configured to control the stator assembly to supply power to the relatively high voltage loads via the HESS and to supply power to the relatively low voltage loads through the DC-DC converter and the LV-ESS;
wherein the rotor assembly has a rotor core configured to support permanent magnets spaced around the rotor core to define a number of rotor poles;
wherein the rotor core has multiple rotor slots arranged as at least one barrier layer at each of the rotor poles; wherein the at least one barrier layer is positioned between an inner periphery of the rotor core and an outer periphery of the rotor core;
wherein the permanent magnets are disposed in the at least one barrier layer;
wherein the stator assembly surrounds the rotor assembly;
wherein the rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine; and
wherein the permanent magnets are a dysprosium (Dy)-reduced material with a maximum energy product from about 33 mega Gauss Oersteds (MGOe) to about 48 MGOe and are configured to saturate a bridge of the rotor core between the at least one barrier layer and the outer periphery of the rotor core.

20. An electric machine for a dual voltage power system having a first energy storage system (HV-ESS) with a first nominal voltage and second energy storage system (LV-ESS) with a second nominal voltage, the electric machine comprising:
a rotor assembly having a rotor core configured to support permanent magnets spaced around the rotor core to define a number of rotor poles;
wherein the rotor core has multiple rotor slots arranged as at least one barrier layer at each of the rotor poles; wherein the at least one barrier layer is positioned between an inner periphery of the rotor core and an outer periphery of the rotor core;
permanent magnets disposed in the at least one barrier layer;
a stator assembly surrounding the rotor assembly;

wherein the electric machine is configured to operatively connected with the HV-ESS to function as at least one of a motor and a generator;

wherein the rotor assembly, the stator assembly, and the permanent magnets are configured with parameters selected to provide at least one of a predetermined efficiency at rated power, a predetermined power density, a predetermined torque density, a predetermined peak power range, or a predetermined maximum speed of the electric machine; and wherein the electric machine is configured to provide at least one of a short circuit current over an entire speed range of the electric machine that is not less than 0.6 and not more than 0.9 multiplied by a rated current of the electric machine, a normalized flux linkage that is greater than 0.7 at a peak torque of the electric machine, or a saliency ratio of not less than 1.5 and not greater than 3.0 at a rated torque of the electric machine.

* * * * *

UNITED STATES PATENT AND TRADEMARK OFFICE
CERTIFICATE OF CORRECTION

PATENT NO. : 9,925,889 B2  
APPLICATION NO. : 15/194600  
DATED : March 27, 2018  
INVENTOR(S) : Lei Hao, Chandra S. Namuduri and Thomas W. Nehl Page 1 of 1

It is certified that error appears in the above-identified patent and that said Letters Patent is hereby corrected as shown below:

On the Title Page

(74) Attorney, Agent, or Firm - Quiunn IP Law should be read as Quinn IP Law.

Signed and Sealed this
Twenty-sixth Day of June, 2018

Andrei Iancu
*Director of the United States Patent and Trademark Office*